(12) United States Patent
Nakamura et al.

(10) Patent No.: US 11,361,572 B2
(45) Date of Patent: Jun. 14, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Shinya Nakamura, Kanagawa (JP); Akane Abe, Kanagawa (JP); Shintaro Adachi, Kanagawa (JP); Kunihiko Kobayashi, Kanagawa (JP); Kazuhiro Oya, Kanagawa (JP); Shigeru Okada, Kanagawa (JP); Junichi Shimizu, Kanagawa (JP); Akinobu Yamaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 377 days.

(21) Appl. No.: 16/351,555

(22) Filed: Mar. 13, 2019

(65) Prior Publication Data
US 2019/0362143 A1   Nov. 28, 2019

(30) Foreign Application Priority Data

May 25, 2018   (JP) .............................. JP2018-100397

(51) Int. Cl.
*G06V 30/416* (2022.01)
*G06V 30/148* (2022.01)
(Continued)

(52) U.S. Cl.
CPC .......... *G06V 30/416* (2022.01); *G06V 30/153* (2022.01); *G06V 30/412* (2022.01); *G06V 30/10* (2022.01)

(58) Field of Classification Search
CPC .. G06K 9/00449; G06K 9/00469; G06K 9/46; G06K 9/344; G06K 2209/01;
(Continued)

(56) References Cited

U.S. PATENT DOCUMENTS 8,059,896 B2   11/2011   Ito
8,139,870 B2   3/2012   Kato
(Continued)

FOREIGN PATENT DOCUMENTS

JP   H06103402   4/1994
JP   H09231291   9/1997
(Continued)

OTHER PUBLICATIONS

Junichi Hirayama et al., "Definition-Less Atypical Form Recognition Technique Using Hypothesis Testing Approach" with English translation thereof, Journal of the Institute of Electronics, Information and Communication Engineers, Dec. 2014, pp. 1-33.
(Continued)

*Primary Examiner* — Daniel G Mariam
(74) *Attorney, Agent, or Firm* — JCIPRNET

(57) ABSTRACT

An information processing apparatus includes a processing unit, an extraction unit, a memory unit, a determination unit, and an assignment unit. The processing unit executes a character recognition process. The extraction unit extracts at least one area located within a predetermined range from a first area that is included in a designated image and that is designated to undergo the character recognition process. The at least one area is a second area. The memory unit stores an attribute on a per character string basis. The determination unit determines, on a basis of the attribute stored by the memory unit, an attribute corresponding to a character string recognized as one or more characters from the first area by the processing unit and a character string recognized as one
(Continued)

or more characters from the second area by the processing unit. The assignment unit assigns the determined attribute to the designated image.

18 Claims, 10 Drawing Sheets

(51) Int. Cl.
*G06V 30/412* (2022.01)
*G06V 30/10* (2022.01)

(58) Field of Classification Search
CPC .... G06V 30/10; G06V 30/153; G06V 30/412; G06V 30/416; G06V 10/40
USPC ......................................... 382/176, 181, 190
See application file for complete search history.

(56) References Cited

U.S. PATENT DOCUMENTS

| | | | |
|---|---|---|---|
| 2010/0202015 A1* | 8/2010 | Misawa | H04N 1/00331 358/1.15 |
| 2016/0227066 A1* | 8/2016 | Shimazaki | G06K 9/00449 |
| 2019/0279394 A1* | 9/2019 | Yonezawa | G07G 1/145 |

FOREIGN PATENT DOCUMENTS

| | | |
|---|---|---|
| JP | 2004240488 | 8/2004 |
| JP | 2006185342 | 7/2006 |
| JP | 2007233913 | 9/2007 |
| JP | 2007304864 | 11/2007 |
| JP | 2012208589 | 10/2012 |

OTHER PUBLICATIONS

"Office Action of Japan Counterpart Application" with English translation thereof, dated Mar. 15, 2022, p. 1-p. 6.

* cited by examiner

INVOICE

Accounting Department
XXXXX Corporation
XX Bldg., 5F
9-9-9 XX, XX Ward, Tokyo
999-999

Date of issue: May 25, 2015

E-mail: sample@sample.co.jp
Contact: YY, XXX Dept.

Please be advised that your payment is listed below.

Invoice No.: 20150999
Charging date: May 25, 2015

| Charge including (consumption tax) | ¥10,800- | Bank account | Sample Corporation 1234568, Ordinary deposit account YYY Branch, XX Bank |
|---|---|---|---|
| Due date | August 1, 2018 | | |

* Please check the description and make a bank transfer to the bank account by the due date.
* Please burden the bank transfer fee at your expense.

| Item | | | Unit price | Quantity | Amount |
|---|---|---|---|---|---|
| 12345678 | ABCDE | White 400 mm × 900 mm | 10,000 | 1 | 10,000 |
| | | | | Subtotal | 10,000 |
| | | | | Tax | 800 |
| | | | | Total | 10,800 |

Remarks

FIG. 6

INVOICE

Accounting Department
~~XXXXX Corporation~~ ─A111
XX Bldg., 5F
9-9-9 XX, XX Ward, Tokyo
999-999

Date of issue: May 25, 2015

E-mail: sample@sample.co.jp
Contact: YY, XXX Dept.

Invoice No.: ~~20150999~~ ─A113
Charging date: ~~May 25, 2015~~ ─A114

Please be advised that your payment is listed below.
　　　　　　　　　　　　　A112

| Charge including (consumption tax) | ~~¥10,800~~ | Bank account | Sample Corporation 1234568, Ordinary deposit account YYY Branch, XX Bank |
|---|---|---|---|
| Due date | August 1, 2018 | | |

* Please check the description and make a bank transfer to the bank account by the due date.
* Please burden the bank transfer fee at your expense.

| Item | | | Unit price | Quantity | Amount |
|---|---|---|---|---|---|
| 12345678 | ABCDE | White 400 mm × 900 mm | 10,000 | 1 | 10,000 |
| | | | | Subtotal | 10,000 |
| | | | | Tax | 800 |
| | | | | Total | 10,800 |

Remarks

FIG. 9

| CATEGORY | RULE |
|---|---|
| COMPANY NAME | "Corporation" IS INCLUDED. |
| | "Co., Ltd" IS INCLUDED. |
| | "Company" IS INCLUDED. |
| | COMPANY NAME EXAMPLE 1 |
| | COMPANY NAME EXAMPLE 2 |
| AMOUNT | CURRENCY SIGN IS INCLUDED. |
| | THERE IS "," EVERY THREE DIGITS. |
| | THERE IS "-" AT THE END. |
| | THERE IS "yen", "dollars", or ... AT THE END. |
| | THERE IS A NUMERIC EXPRESSION ("zero", or ...). |
| DATE | YEAR, MONTH, AND DAY ARE SEPARATED WITH "/" FROM EACH OTHER. |
| | YEAR, MONTH, AND DAY ARE INCLUDED. |
| | ANY OF "Jan." to "Dec." IS INCLUDED. |
| | ANY OF "Nichi" to "Do" IN JAPANESE IS INCLUDED. |
| | ANY OF "Sun." to "Sat." IS INCLUDED. |
| NUMERIC VALUE | NUMERIC STRING THAT IS NEITHER AMOUNT NOR DATE |

FIG. 10

```
Attribute name: Amount
Attribute value:
  {
    "First": "¥10,000",
    "Second": "¥2,000",
       . . .
  }
```

FIG. 12

| CATEGORY | CHARACTER STRING |
|---|---|
| AMOUNT | CHARGE |
|  | DESCRIPTION |
|  | PAYMENT |
|  | VOUCHER |
|  | ... |
| ⋮ | ⋮ |

FIG. 13

```
                                                          ╱─A1
┌─────────────────────────────────────────────────────────────────┐
│                                                                 │
│  INVOICE                                                        │
│  ─────────────────────────────────────────────────────────────  │
│  Accounting Department                    Date of issue: May 25, 2015
│  X̶X̶X̶X̶ ̶C̶o̶r̶p̶o̶r̶a̶t̶i̶o̶n̶  ─A111
│  X̶X̶ ̶B̶l̶d̶g̶.̶,̶ ̶5̶F̶  ──────A211             E-mail: sample@sample.co.jp
│  9-9-9 XX, XX Ward, Tokyo                 Contact: YY, XXX Dept.
│  999-999                                A213─╲
│                                              ╲ Invoice No.: 2̶0̶1̶5̶0̶9̶9̶9̶  ─A113
│  Please be advised that your payment is listed below.
│  A222        ╱─A212        ╱─A112       A214─╲ Charging date: M̶a̶y̶ ̶2̶5̶,̶ ̶2̶0̶1̶5̶  ─A114
```

| Charge (including consumption tax) | ¥̶1̶0̶,̶8̶0̶0̶ | Bank account | Sample Corporation 1234568, Ordinary deposit account YYY Branch, XX Bank |
|---|---|---|---|
| Due date | August 1, 2018 | | |

* Please check the description and make a bank transfer to the bank account by the due date.
* Please burden the bank transfer fee at your expense.

| Item | | | Unit price | Quantity | Amount |
|---|---|---|---|---|---|
| 12345678 | ABCDE | White 400 mm × 900 mm | 10,000 | 1 | 10,000 |
| | | | | | |
| | | | | | |
| | | | | | |
| | | | | Subtotal | 10,000 |
| | | | | Tax | 800 |
| | | | | Total | 10,800 |

Remarks

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-100397 filed May 25, 2018.

BACKGROUND

(i) Technical Field

The present disclosure relates to an information processing apparatus and a non-transitory computer readable medium.

(ii) Related Art

Electronic document filing by which a paper document is scanned and stored as an electronic document file has been performed. The performance of searching has also been improved in the electronic document filing in such a manner that an optical character recognition (OCR) process is executed on a scanned image and the result of the character recognition process to serve as an attribute value is combined with the image. For example, Japanese Unexamined Patent Application Publication No. 2007-233913 discloses the following process. Specifically, the item name of each of items to be extracted from a document image and a relative location of an item value in the document image are registered in a database. In the relative location, the item value is to be present relative to the item name. Character recognition is performed on a document image, and a character string corresponding to the item name of the item to be extracted is obtained from the result of the character recognition. A character string in the relative location in which the item value is to be present relative to the obtained item name is extracted as the item value relative to the item name.

Japanese Unexamined Patent Application Publication No. 2006-185342 describes an information processing apparatus that performs semantic-attribute-based classification of character strings each assigned to one of multiple semantic attributes in a character string group. In the information processing apparatus, databases 105 to 107 are referred to on a per character string basis, each character string is analyzed, and a score indicating the likelihood of assignment of the character string to the semantic attribute is calculated for the character string by using multiple scoring methods. The character string is then classified on the basis of a total value of the scores that is calculated on the basis of the combination pattern of the assignment of the character string to the semantic attribute. Japanese Unexamined Patent Application Publication No. 2004-240488 describes a process executed when a paper document is scanned to generate an electronic document. In the process, searching is performed on results of character recognition, and a character string considered to describe a date when the document is generated is found and then assigned as a file attribute to the document.

SUMMARY

Aspects of non-limiting embodiments of the present disclosure relate to providing technology for assigning an attribute to image data not having undergone definition of the attribute, the technology eliminating the need for setting the attribute in advance by a user.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processing unit, an extraction unit, a memory unit, a determination unit, and an assignment unit. The processing unit executes a character recognition process. The extraction unit extracts at least one area located within a predetermined range from a first area that is included in a designated image and that is designated to undergo the character recognition process. The at least one area is a second area. The memory unit stores an attribute on a per character string basis. The determination unit determines, on a basis of the attribute stored by the memory unit, an attribute corresponding to a character string recognized as one or more characters from the first area by the processing unit and a character string recognized as one or more characters from the second area by the processing unit. The assignment unit assigns the determined attribute to the designated image.

BRIEF DESCRIPTION OF THE DRAWINGS

An exemplary embodiment of the present disclosure will be described in detail based on the following figures, wherein:

FIG. 5 is a view illustrating a document;

FIG. 6 is a view illustrating a document having marked target areas;

FIG. 9 is a table illustrating the content of a category rule database;

FIG. 10 is a view illustrating the content of attribute data;

FIG. 12 is a table illustrating the content of an attribute name database; and FIG. 13 is a view illustrating subareas.

DETAILED DESCRIPTION

1. Configuration

Figure 1:
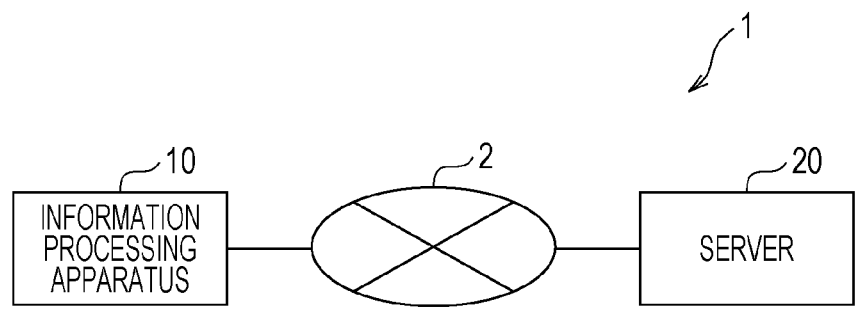
FIG. 1 is a block diagram illustrating the configuration of an information processing system.

FIG. 1 is a block diagram illustrating the configuration of an information processing system 1 according to an exemplary embodiment. The information processing system 1 includes an information processing apparatus 10 and a server 20. The information processing apparatus 10 performs image processing such as an image forming process for forming an image on a medium such as a paper sheet or an image reading process for reading an image formed on a medium such as a document. The server 20 provides various services such as a storage service. The information processing apparatus 10 is connected to the server 20 via a communication network 2. The communication network 2 includes at least one of, for example, the Internet, a mobile communication network, a telephone network, and a local area network (LAN).

Figure 2:
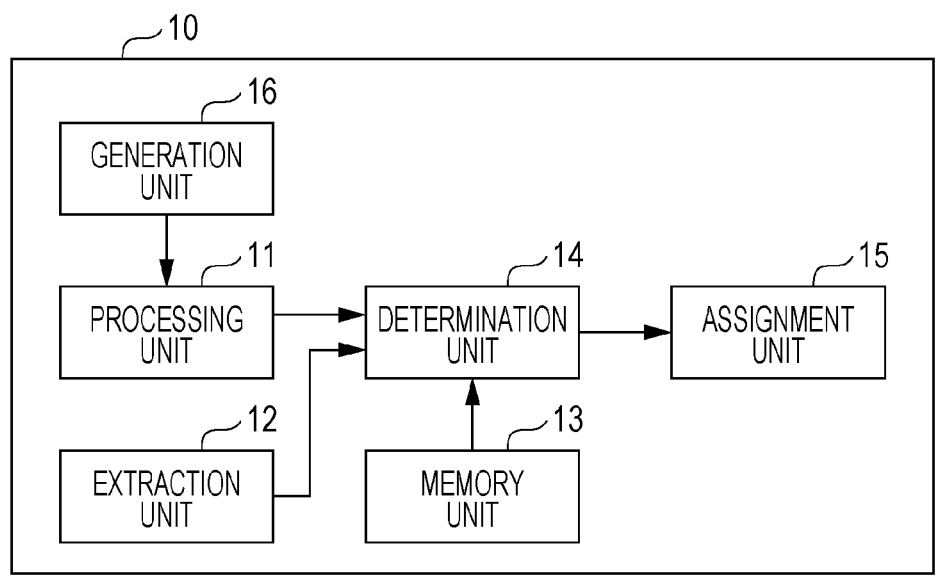
FIG. 2 is a block diagram illustrating the functional configuration of an information processing apparatus.

FIG. 2 is a block diagram illustrating the functional configuration of the information processing apparatus 10. The information processing apparatus 10 includes a processing unit 11, an extraction unit 12, a memory unit 13, a determination unit 14, an assignment unit 15, and a generation unit 16. The processing unit 11 executes a character recognition process. The extraction unit 12 extracts a second area located within a predetermined range from a first area that is included in an image to be processed (hereinafter, referred to as a designated image) and that is designated to undergo the character recognition process. The memory unit 13 stores attributes on a per character string basis. In this exemplary embodiment, the term "attribute" denotes information indicating the type of information (an attribute value) assigned to an image.

On the basis of the attributes stored in the memory unit 13, the determination unit 14 determines an attribute for character strings in the respective first and second areas, the character strings being recognized as characters by the processing unit 11. The assignment unit 15 assigns the attribute determined by the determination unit 14 to a designated image. The generation unit 16 performs image analysis on a designated image read by an image reading unit and thereby generates designation data for designating the first area to undergo the character recognition process.

Figure 3:
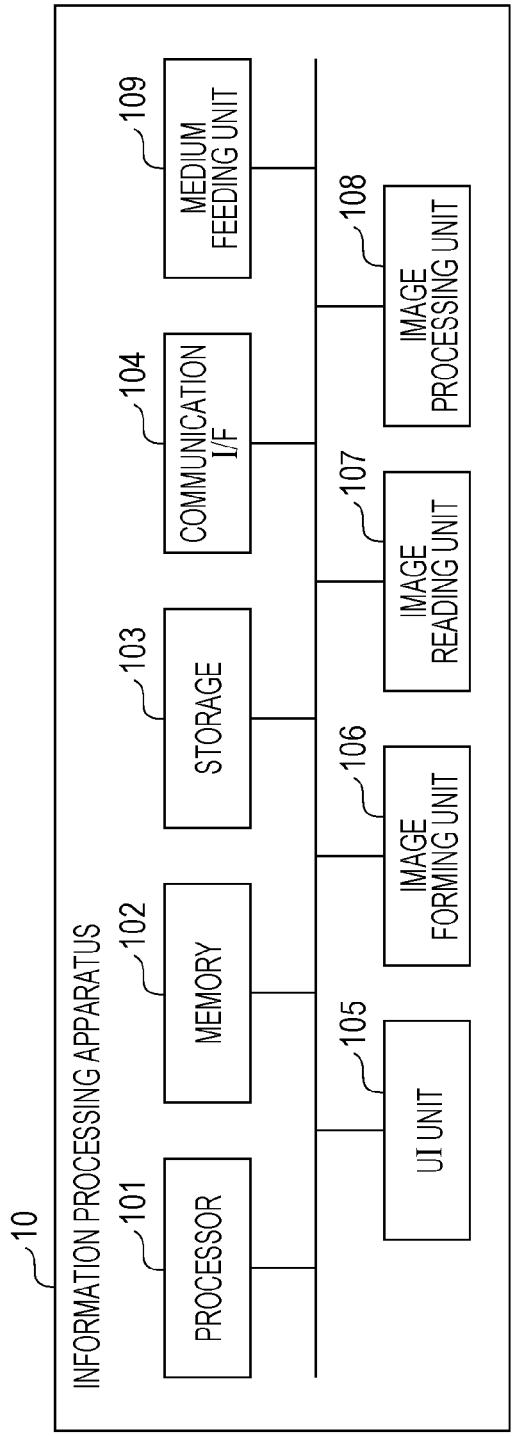
FIG. 3 is a block diagram illustrating the hardware configuration of the information processing apparatus.

FIG. 3 is a diagram illustrating the hardware configuration of the information processing apparatus 10. A processor 101 controls the other components of the information processing apparatus 10. A memory 102 is a memory device that functions as a work area for the processor 101 to run programs and includes, for example, a random access memory (RAM). A storage 103 is a memory device that stores various programs and data and includes, for example, a solid state drive (SSD) or a hard disk drive (HDD). A communication interface (I/F) 104 communicates with a different apparatus in accordance with a predetermined wireless or wired communication standard (for example, Wi-Fi (registered trademark), Bluetooth (registered trademark), or Ethernet (registered trademark)).

A user interface (UI) unit 105 includes, for example, a touch screen and keys. The UI unit 105 may be incorporated in or externally connected to the information processing apparatus 10. An image forming unit 106 forms an image on a medium such as a paper sheet by using an electrophotographic system. An image reading unit 107 optically reads an image on a document (medium). An image processing unit 108 includes, for example, a digital signal processor (DSP) or a graphics processing unit (GPU) and performs various types of image processing. A medium feeding unit 109 supplies a medium such as a paper sheet to the image forming unit 106.

In this example, the processor 101 or the image processing unit 108 runs the programs stored in the memory 102 or the storage 103, and the functions illustrated in FIG. 2 are thereby implemented. The processor 101 or the image processing unit 108 that runs the programs is an example of the processing unit 11, the extraction unit 12, the memory unit 13, the determination unit 14, the assignment unit 15, and the generation unit 16.

Figure 4:
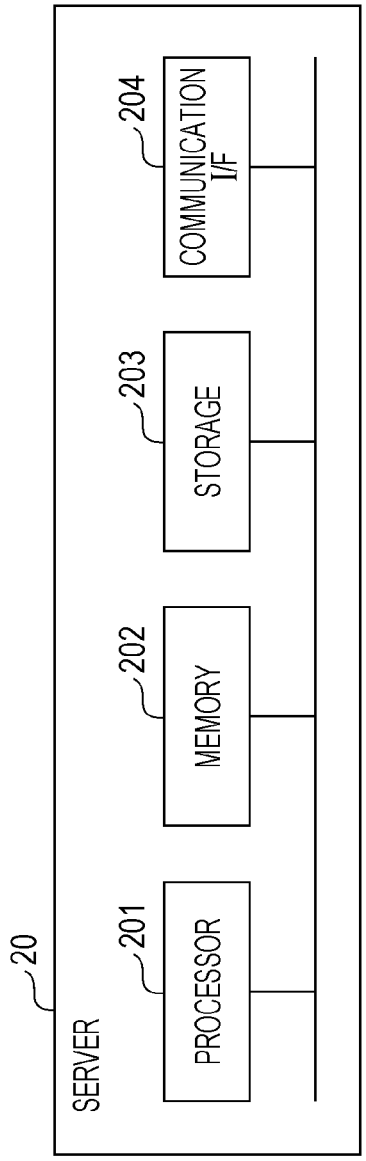
FIG. 4 is a block diagram illustrating the hardware configuration of a server.

FIG. 4 is a diagram illustrating the hardware configuration of the server 20. A processor 201 controls the other components of the server 20. A memory 202 is a memory device that functions as a work area for the processor 201 to run programs and includes, for example, a RAM. A storage 203 is a memory device that stores various programs and data and includes, for example, a SSD or a HDD.

A communication I/F 204 communicates with a different apparatus in accordance with a predetermined wireless or wired communication standard.

2. Operation 2-1. Operation Example 1

In this operation example, the information processing apparatus 10 reads a document and accumulates image data representing the read document in the server 20 that is a storage server. The image data is assigned attribute names and attribute values that are determined from characters read from the document by performing character recognition. The document to be read includes characters (and an image) and is, for example, an invoice, a voucher, a receipt, a license, or a membership card.

Each attribute name is assigned to the image data for improving the performance of image data searching and is, for example, a company name, a date, or a charge. For example, if an attribute has the attribute name Charge, a value representing a charge read from the document is set as the attribute value of the attribute. In addition, for example, if an attribute has the attribute name Company name, a character string representing a company name read from the document is set as the attribute value of the attribute. One or more attributes may be assigned to one piece of image data.

FIG. 5 is a view illustrating a document read by the information processing apparatus 10. A document A1 illustrated in FIG. 5 is an invoice. In the example in FIG. 5, the document A1 has character strings denoting a company name, a charge, an invoice number, a charging date, and the like.

Hereinafter, operation performed when image reading is continuously performed on multiple documents in the document format illustrated in FIG. 5 will be described. Before causing the information processing apparatus 10 to read each document, a user designates, on the first document, at least one area from which an attribute value is to be read (hereinafter, referred to as a target area). In this exemplary embodiment, the user designates the target area (an example of a first area) by marking a character string in the document with a highlighter or the like.

FIG. 6 is a view illustrating a document having marked target areas. In the example in FIG. 6, an area A111 having a company name, an area A112 having a charge, an area A113 having an invoice number, and an area A114 having a charging date are marked by the user. To designate a target area, for example, a character string intended to be designated as an attribute may be traced with the highlighter or may be surrounded by a line. The target area may also be designated, for example, in such a manner that the user writes a predetermined character or a sign such as a check mark on the left side of a character string intended to be designated.

The user performs the marking of the target area on only one document and does not perform the marking on the other documents. Upon completing the marking of the target area, the user sets the multiple documents on the information processing apparatus 10 to first read the document having the marked target area and causes the image reading process to be executed.

Figure 7:
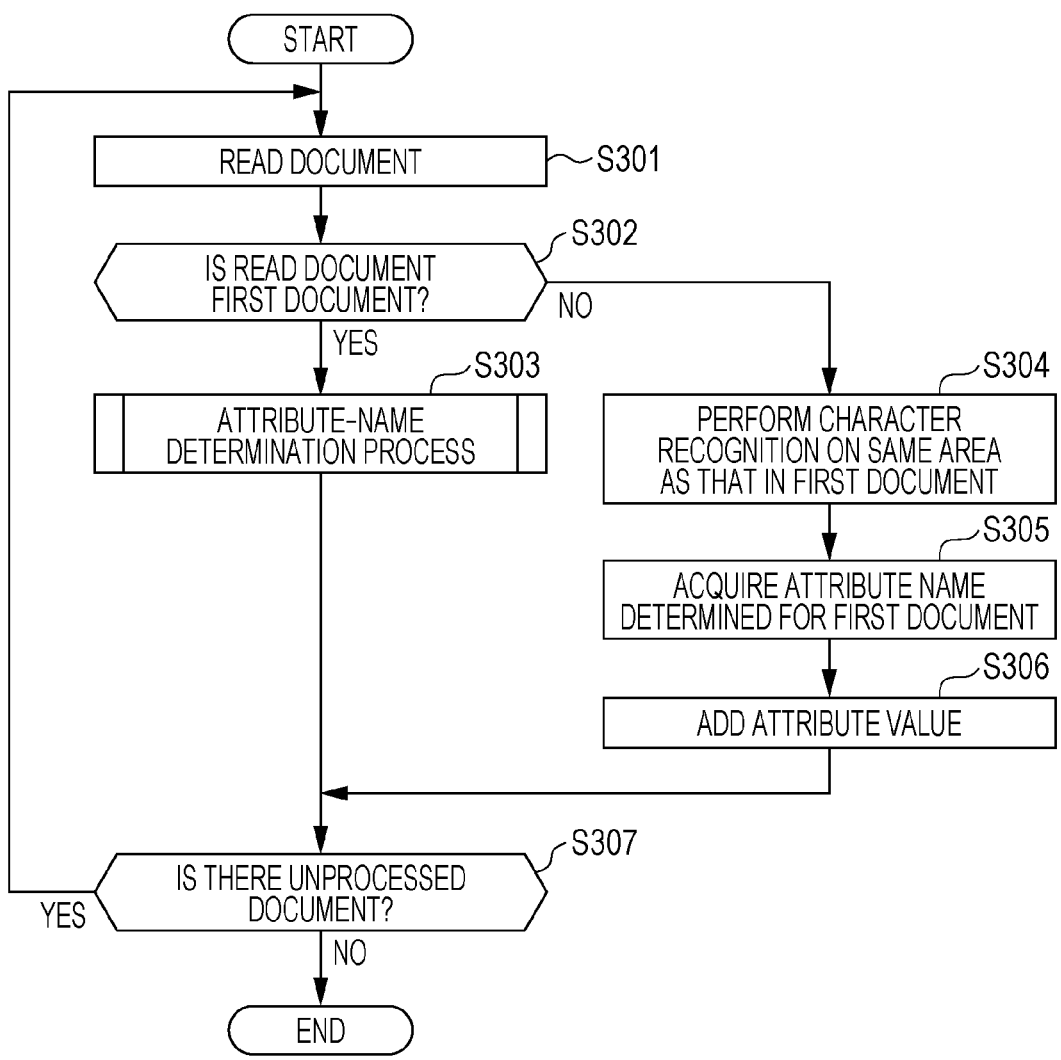
FIG. 7 is a flowchart illustrating the flow of a process executed by the information processing apparatus.

FIG. 7 is a flowchart illustrating the flow of a process executed by the information processing apparatus 10. The process illustrated in FIG. 7 is started, triggered by an image reading instruction made in such a manner that the user sets the multiple documents on the information processing apparatus 10 and then performs a pressing operation of the start button or another operation.

In step S301, the processor 101 of the information processing apparatus 10 controls the image reading unit 107 to perform the image reading. In step S301, the image reading is first performed on the first document (a document having at least one target area marked by the user).

In step S302, the processor 101 judges whether the read document is the first document. If the read document is the first document (YES in step S302), the processor 101 proceeds to step S303. In contrast, if the read document is the second document or a document subsequent thereto (NO in step S302), the processor 101 proceeds to step S304. In step S303, the processor 101 executes an attribute-name determination process.

Figure 8:
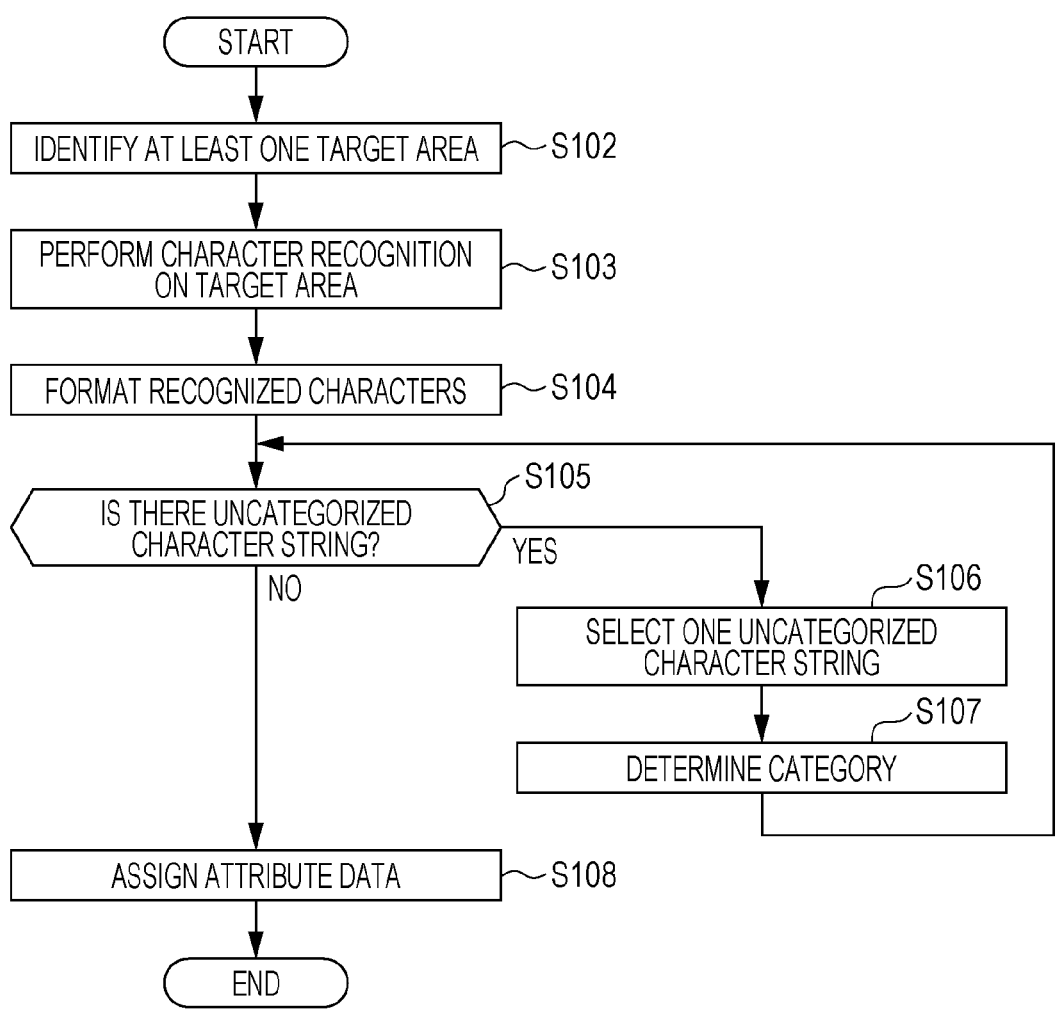
FIG. 8 is a flowchart illustrating the flow of a process executed by the information processing apparatus.

FIG. 8 is a flowchart illustrating the flow of the attribute-name determination process in step S303 in FIG. 7. In step S102, the processor 101 executes a process for identifying a target area used for determining an attribute name. In this exemplary embodiment, the processor 101 analyzes an image representing the read document and identifies an area having a feature pattern matching the predetermined marking method. For example, the processor 101 analyzes an image representing the read document and identifies at least one area in a predetermined background color (target area marked with a predetermined-color highlighter). In a case where the read document is the document illustrated in FIG. 6, the areas A111 to A114 are identified as the target areas. The processor 101 stores location information indicating the location of the identified target area in a predetermined memory area (hereinafter, referred to as a memory area M1) of the memory 102 or the storage 103. In this exemplary embodiment as described above, the processor 101 performs the image analysis on the image of the first document (an example of a designated image) read by the image reading unit 107 and thereby generates designation data designating the target area to undergo character recognition.

In step S103, the processor 101 performs the character recognition process on the target area. To execute the character recognition process, for example, a method described in Japanese Unexamined Patent Application Publication No. 2007-304864 may be used. In step S104, the processor 101 executes a process for formatting recognized characters. In this exemplary embodiment, the term "formatting characters" denotes executing a process for performing morphological analysis or the like on the recognized characters and changing the recognized characters to a character string having meaning (for example, a word or a date and time). If there are multiple target areas, the processor 101 executes the character recognition process and the formatting process on each target area. By executing the processes, a character string for determining an attribute is extracted from the image of the document. In the case where the read document is the document illustrated in FIG. 6, four character strings "XXXXX Corporation", "\10,800-", "20150999", and "May 25, 2015" are respectively extracted from the areas A111 to A114.

After the completion of steps S103 and S104, the processor 101 performs steps S106 and S107 on each character string recognized from the corresponding target area and executes a process for categorizing the recognized character string.

In step S105, the processor 101 judges whether the categorization process has been executed on every recognized character string. If there is an uncategorized character string (YES in step S105), the processor 101 proceeds to step S106. In contrast, if the categorization process has been executed on every character string (NO in step S105), the processor 101 proceeds to step S108.

In step S106, the processor 101 selects one uncategorized character string. In step S107, the processor 101 refers to a category rule database stored in the storage 103 and determines a category (attribute name) as which the extracted character string is to be classified. The category rule database stores one or more character-string arrangement rules on a per-category basis. In this exemplary embodiment, the categories are, for example, an amount, a numeric value, year, month, and day (a date), a company name, a product name, a technology, and a name of a person. Each determined category (attribute name) is stored in the memory area M1 in association with the location information generated in step S102.

FIG. 9 is a table illustrating the content of the category rule database. In the example in FIG. 9, items Category and Rule are associated with each other in the database. Among these items, the item Category has information indicating attribute names (categories) such as Company name and Amount. The item Rule has information indicating a rule providing that Corporation is included, a rule providing that Company is included, and other rules.

The information processing apparatus 10 refers to the category rule database, calculates, on a per-category (attribute) basis, an application value indicating the degree of application of a character-string arrangement rule to each character string recognized from the corresponding target area, and determines the category by using the calculation result. The category is determined, for example, in the following manner. Each of conditions for the corresponding category is associated with a value representing the degree of application (hereinafter, referred to as a degree of conformance). The processor 101 calculates the degree of conformance for each category and determines, as an attribute name, the category having the highest calculated degree of conformance.

For example, if a character string recognized from a target area is Zerox Corporation, scores are calculated on a per-category basis in the following manner. Since the character string Corporation is included, the category Company name has a score of 3. Since the character string Zero is included but there are a large number of characters other than numerals, the categories Amount and Numeric value each have a score of 1. Since a character string related to the category Date is not included, the category Date has a score of 1. In this case, the category Company name having the highest score is used as the attribute name.

In the example of the document in FIG. 6, the character string Corporation is included in the character string read from the area A111, and thus Company name is determined as a category for the character string. In addition, a currency sign and a numeric string are included in the character string read from the area A112, and thus Amount is determined as a category for the character string.

Referring back to the description of FIG. 8, after the completion of step S107, the processor 101 returns to step S105. If the category has been determined for every character string in step S105 (NO in step S105), the processor 101 proceeds to step S108. In step S108, the processor 101 generates attribute data having the determined categories as attribute names and the recognized character strings as attribute values and assigns the attribute data to image data.

Referring back to the description of FIG. 7, after the completion of the attribute-name determination process in step S303, the processor 101 proceeds to step S307. In step S307, the processor 101 judges whether there is an unprocessed document. If it is judged that there is an unprocessed document (YES in step S307), the processor 101 proceeds to step S301. In contrast, if there is not an unprocessed document (NO in step S307), the processor 101 terminates the process. The image data to which one or more attributes are assigned by the information processing apparatus 10 is transmitted to and accumulated in a storage server such as the server 20. Each assigned attribute is used as a search key, for example, when searching is performed on a file (image data).

In step S302, if the read document is the second document or a document subsequent thereto (NO in step S302), the processor 101 proceeds to step S304. In step S304, the processor 101 reads out the location information from the memory area M1 and executes the character recognition process on a target area identified from the read location information (that is, an area in the same location as the location of the target area identified in the first document).

In step S305, the processor 101 reads out the attribute name corresponding to the location information from the memory area M1 and thereby acquires the attribute name. In step S306, the processor 101 adds, to the attribute data including the attribute name acquired in step S305, an attribute value resulting from the character recognition performed on the target area corresponding to the attribute name.

FIG. 10 is a view illustrating the content of the attribute data. In the example in FIG. 10, the attribute data includes the attribute name Amount and multiple attribute values. Since each attribute value is extracted on a per-document basis, the multiple attribute values are associated with one attribute name.

2-2. Operation Example 2

A different operation example in this exemplary embodiment will be described.

Figure 11:
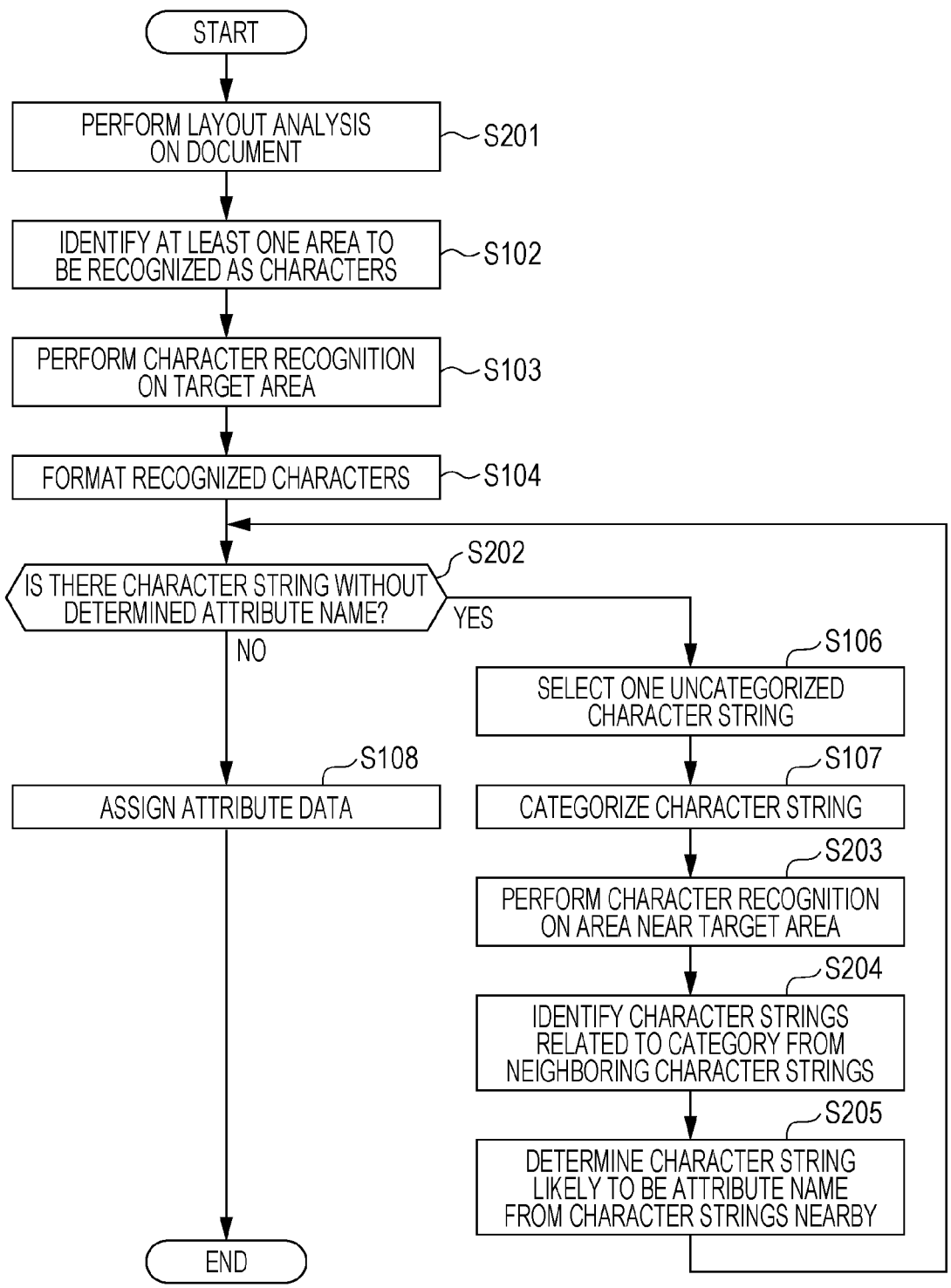
FIG. 11 is a flowchart illustrating the flow of a process executed by the information processing apparatus.

FIG. 11 is a flowchart illustrating the flow of a process executed by the information processing apparatus 10. The flowchart in FIG. 11 corresponds to the flowchart in FIG. 8 described in Operation Example 1 above.

The flowchart illustrated in FIG. 11 is different from the flowchart illustrated in FIG. 8 in that step S201 is performed before step S102, step S202 is performed instead of step S105, and steps S203 to S205 are performed before step S107.

In step S201, the processor 101 performs layout analysis on the image of the read document. By performing the layout analysis, a text area and an image area are recognized. After the completion of step S201, the processor 101 proceeds to step S102.

After the completion of step S104, the processor 101 proceeds to step S202. In step S202, the processor 101 judges whether the attribute name has been determined for every identified target area. If there is a target area without a determined attribute name (YES in step S202), the processor 101 proceeds to step S106. In contrast, if the attribute name has been determined for every target area (NO in step S202), the processor 101 proceeds to step S108.

After the completion of steps S106 and S107, the processor 101 proceeds to step S203. In step S203, the processor 101 executes the character recognition process on an area near the target area (a location relationship between the area and the target area satisfies a predetermined condition (hereinafter, the area is also referred to as a subarea)). In this exemplary embodiment, a text area located on the left or upper side of the target area among the text areas identified though the layout analysis is handled as a subarea (an example of a second area).

FIG. 13 is a view illustrating subareas. In FIG. 13, a text area A213 having "Invoice number:" is identified as the subarea of the area A113, and a text area A214 having "Charging date:" is identified as the subarea of the area A114. An area A212 having "Charge" and an area A222 having "(including consumption tax)" are identified as the subareas of the area A112, and a text area A211 having "XX Bldg., 5F" is identified as the subarea of the area A111. As described above, for one target area, one subarea is identified in some cases, and multiple subareas are identified in other cases. In addition, there may be a target area without an identified subarea.

Referring back to the description of FIG. 11, in step S204, the processor 101 identifies character strings related to a category from the character strings recognized as characters from the subareas. Step S204 is performed, for example, by referring to an attribute name database stored in the storage 103.

FIG. 12 is a table illustrating the content of the attribute name database. In the example in FIG. 12, multiple character strings are associated with one Category. For example, Charge, Description, Payment, and Voucher are associated with the item Amount.

In the example in FIG. 13, character strings that are Charge and (including consumption tax) are recognized from the subareas of the area A112. The processor 101 collates each character string recognized in the corresponding subarea with character strings registered in the attribute name database and determines, as an attribute name, a character string having the collation result satisfying a predetermined condition. In this case, Charge is registered as a character string associated with Amount, and the character string is included in the character string read from the subarea. Accordingly, Charge is determined as a character string serving as an attribute name candidate.

Referring back to the description of FIG. 11, after the completion of step S204, the processor 101 proceeds to step S205. In step S205, the processor 101 determines a character string likely to be an attribute name among the multiple character strings identified in step S204. In the determination process, for example, priority may be given in advance to the character strings registered in the attribute name database, and the character string with the highest priority may be determined as the attribute name. In another example, for example, a character string in the subarea in the shortest distance from the target area having the character string read as an attribute value may be determined as the attribute name. After the completion of step S205, the processor 101 returns to step S202 and continues the process until the attribute name is determined for every character string. By executing the process in FIG. 11, the attribute data including multiple sets of an attribute name and an attribute value is assigned to the image data of the read document.

In this operation example as described above, an attribute name has been categorized (the attribute name database), a category is determined by using a character string in a target area (an example of the first area), and an attribute name is determined from the determined category by using a character string in a subarea (an example of the second area).

In the related art, the user needs to define in advance an attribute to be assigned to image data. For example, the user needs to verify a character recognition result by using the operation panel of an image processing apparatus or an application program of a personal computer and then manually determine an attribute. If documents to be processed are documents in a fixed format, the attribute assignment process is executable in such a manner that the user defines the attribute in advance. However, if documents in various forms not in a fixed format are to be processed, it is troublesome in some cases that the user performs an operation for registering an attribute every time processing is performed. In contrast, in this exemplary embodiment, even if the format of documents to be processed is not known in advance, an attribute is assigned to image data representing each document, and the user does not have to perform a troublesome operation.

In this exemplary embodiment, the processor 101 performs the layout analysis on a read document and acquires detail information serving as a candidate for an attribute name from an area near a target area. For example, if a category determined from a character string in the target area is Amount, searching is performed on an area on the left or upper side of the target area to find whether a character string such as Invoice, Description, Payment, or Voucher is present. If only one character string is found, the character string is determined as the attribute name. In contrast, if multiple character strings are found, for example, the character string in the subarea in the shortest distance from the target area is determined as the attribute name. A more specific attribute name for the document is thereby assigned to the image data.

In this exemplary embodiment, when multiple documents (a bundle of documents) are read, the attribute-name determination process is executed on the first document, and the attribute name determined for the first document is used for the other documents. This eliminates the need for the user's designating a target area for determining an attribute name in each of the multiple documents and omits a process for determining an attribute name for each of the multiple documents.

3. Modifications

The exemplary embodiment described above is merely an example of the implementation of the present disclosure and may be modified as below. The exemplary embodiment described above and the modifications below may be implemented in combination with each other as needed.

(1) In the exemplary embodiment, the character recognition process is executed on the multiple target areas in one document collectively (step S103 in FIG. 8). A method for the character recognition process is not limited to the method described in the exemplary embodiment. For example, if there are multiple target areas, the character recognition process and the category determination process may be executed for the target areas one by one, that is, the processes may be repeated as many times as the number of the target areas.

(2) In the exemplary embodiment, the text area located on the left or upper side of the target area is identified as the subarea. A location relationship between the target area and the subarea is not limited to the location relationship described in the exemplary embodiment. For example, an area located on the right side or the lower side of the text area may be identified. The subarea may be any area located within a predetermined range from the target area.

(3) In the exemplary embodiment, the storage 103 of the information processing apparatus 10 stores the category rule database and the attribute name database. The category rule database and the attribute name database may be stored in an apparatus other than the information processing apparatus 10. For example, the following configuration may be employed. Specifically, the category rule database is stored in the server 20 or a different external server, and the information processing apparatus 10 accesses the category rule database via a communication network.

(4) The category rule database may be updated by an apparatus such as the information processing apparatus 10. In the update process, for example, an attribute name may be registered in such a manner that the user of the information processing apparatus 10 operates the UI unit 105.

(5) In the exemplary embodiment, in the attribute-name determination step (step S107 in FIG. 8) using the category rule database, the processor 101 calculates the degree of conformance for every category and determines the category with the highest calculated degree of conformance as the attribute name. A method for determining the attribute name is not limited to the method described in the exemplary embodiment. For example, priority may be given to the multiple rules registered in the category rule database, and the rules (conditions) may be collated with a character string from the rule with the highest priority. If the character string satisfies a condition, the category for the condition may be employed as the attribute name.

(6) The priority in each rule used as the judgment condition may be variable depending on the content of the character string. For example, if the proportion of numerals in a recognized character string is higher than or equal to a predetermined threshold, the processor 101 may preferentially judge the rules for Amount and Date and then judge the rule for Numeric value. For example, if the recognized character string is 2018/01/24, the character string has eight numerals of ten characters. Accordingly, the judgment may be started with the rules for the categories Amount and Date and then the rule for the category Numeric value. In contrast, if two to seven numerals are included in ten characters, the judgment may be started with the rules for the category Date. If at least one character regarding a currency (such as \ or $) is included at the top or the end, the judgment may be started with the rules for the category Amount. As described above, the processor 101 may determine an attribute name by using the proportion of the characters of a predetermined character type (such as a numeral) included in the recognized character string.

The rules (conditions) registered in the category rule database are not limited to those described in the exemplary embodiment.

(7) In the exemplary embodiment, if multiple character strings are identified in step S204 in FIG. 11, a process for causing the user to select one of the character strings to be determined as an attribute name may be executed. For example, the processor 101 may display the multiple character strings on the UI unit 105 and may also display a message for prompting the user to select one of the character strings as an attribute name.

(8) In the exemplary embodiment, at least one of the processes executed by the information processing apparatus 10 may be executed by a different apparatus such as the server 20. For example, the character recognition process executed by the information processing apparatus 10 in the exemplary embodiment may be executed by the server 20.

For example, the functions illustrated in FIG. 2 may be implemented by the information processing apparatus 10 and the server 20 in corporation with each other.

(9) In the exemplary embodiment, the programs run by the processor 101 of the information processing apparatus 10 or the processor 201 of the server 20 may be downloaded via a communication network such as the Internet. The programs may also be provided in such a manner as to be recorded in a computer-readable recording medium such as a magnetic recording medium (such as a magnetic tape or a magnetic disk), an optical recording medium (such as an optical disk), a magneto-optical recording medium, or a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a storage, storing a plurality of programs, wherein the programs include a processing unit, an extraction unit, a memory unit, a determination unit and an assignment unit; and
    a processor, coupled to the storage and configured to run the processing unit, the extraction unit, the memory unit, the determination unit and the assignment unit, wherein
    the processing unit executes a character recognition process;
    the extraction unit extracts at least one area located within a predetermined range from a first area that is included in a designated image and that is designated to undergo the character recognition process, the at least one area being a second area;
    the memory unit stores an attribute on a per character string basis;
    the determination unit determines a category by using a character string recognized in the first area by the processing unit and determines an attribute from the determined category by using a character string recognized in the second area by the processing unit on a basis of the attribute stored by the memory unit; and
    the assignment unit assigns the determined attribute to the designated image.

2. The information processing apparatus according to claim 1,
    wherein the second area is one of a plurality of second areas, and if there are the plurality of the second areas, the determination unit determines the attribute by using a character string recognized from one of the second areas, and a location relationship between the second area and the first area satisfies a predetermined condition.

3. The information processing apparatus according to claim 2, wherein the programs further include a generation unit, and the processor is configured to run the generation unit to generate location information by performing image analysis on a designated image read by an image reading unit, the location information indicating a location of the first area to undergo the character recognition process,
    wherein if the image reading unit reads a plurality of designated images, the processor is configured to run the determination unit to determine the attribute for each of the plurality of designated images by using the generated location information.

4. The information processing apparatus according to claim 3,
    wherein the determination unit determines the attribute by using a proportion of a character of a predetermined character type, the character being included in the recognized character string in the first area.

5. The information processing apparatus according to claim 4,
    wherein the memory unit stores one or more character-string arrangement rules on a per-attribute basis, and
    wherein the determination unit calculates an application value on the per-attribute basis and determines the attribute by using a calculation result, the application value indicating a degree of application of each of the character-string arrangement rules to the character string recognized from the first area.

6. The information processing apparatus according to claim 3,
    wherein the memory unit stores one or more character-string arrangement rules on a per-attribute basis, and
    wherein the determination unit calculates an application value on the per-attribute basis and determines the attribute by using a calculation result, the application value indicating a degree of application of each of the character-string arrangement rules to the character string recognized from the first area.

7. The information processing apparatus according to claim 2,
    wherein the determination unit determines the attribute by using a proportion of a character of a predetermined character type, the character being included in the recognized character string in the first area.

8. The information processing apparatus according to claim 7,
    wherein the memory unit stores one or more character-string arrangement rules on a per-attribute basis, and
    wherein the determination unit calculates an application value on the per-attribute basis and determines the attribute by using a calculation result, the application value indicating a degree of application of each of the character-string arrangement rules to the character string recognized from the first area.

9. The information processing apparatus according to claim 2,
    wherein the memory unit stores one or more character-string arrangement rules on a per-attribute basis, and
    wherein the determination unit calculates an application value on the per-attribute basis and determines the attribute by using a calculation result, the application value indicating a degree of application of each of the character-string arrangement rules to the character string recognized from the first area.

10. The information processing apparatus according to claim 1, wherein the programs further include a generation unit, and the processor is configured to run the generation unit to generate location information by performing image analysis on a designated image read by an image reading unit, the location information indicating a location of the first area to undergo the character recognition process, wherein if the image reading unit reads a plurality of designated images, the processor is configured to run the determination unit to determine the attribute for each of the plurality of designated images by using the generated location information.

11. The information processing apparatus according to claim 10,
wherein the determination unit determines the attribute by using a proportion of a character of a predetermined character type, the character being included in the recognized character string in the first area.

12. The information processing apparatus according to claim 11,
wherein the memory unit stores one or more character-string arrangement rules on a per-attribute basis, and
wherein the determination unit calculates an application value on the per-attribute basis and determines the attribute by using a calculation result, the application value indicating a degree of application of each of the character-string arrangement rules to the character string recognized from the first area.

13. The information processing apparatus according to claim 10,
wherein the memory unit stores one or more character-string arrangement rules on a per-attribute basis, and
wherein the determination unit calculates an application value on the per-attribute basis and determines the attribute by using a calculation result, the application value indicating a degree of application of each of the character-string arrangement rules to the character string recognized from the first area.

14. The information processing apparatus according to claim 1,
wherein the determination unit determines the attribute by using a proportion of a character of a predetermined character type, the character being included in the recognized character string in the first area.

15. The information processing apparatus according to claim 14,
wherein the memory unit stores one or more character-string arrangement rules on a per-attribute basis, and
wherein the determination unit calculates an application value on the per-attribute basis and determines the attribute by using a calculation result, the application value indicating a degree of application of each of the character-string arrangement rules to the character string recognized from the first area.

16. The information processing apparatus according to claim 1,
wherein the memory unit stores one or more character-string arrangement rules on a per-attribute basis, and
wherein the determination unit calculates an application value on the per-attribute basis and determines the attribute by using a calculation result, the application value indicating a degree of application of each of the character-string arrangement rules to the character string recognized from the first area.

17. A non-transitory computer readable medium storing a program causing a computer to execute a process, the computer including a memory unit storing an attribute on a per character string basis, the process comprising:
extracting an area located within a predetermined range from a first area that is included in a designated image and that is designated to undergo the character recognition process, the area being a second area;
determining a category by using a character string recognized in the first area and determining an attribute from the determined category by using a character string recognized in the second area on a basis of the attribute stored by the memory unit; and
assigning the determined attribute to the designated image.

18. An information processing apparatus comprising:
processing means for executing a character recognition process;
extraction means for extracting an area located within a predetermined range from a first area that is included in a designated image and that is designated to undergo the character recognition process, the area being a second area;
memory means for storing an attribute on a per character string basis;
determination means for determining a category by using a character string recognized in the first area by the processing means and determining an attribute from the determined category by using a character string recognized in the second area by the processing means on a basis of the attribute stored by the memory means; and
assignment means for assigning the determined attribute to the designated image.

* * * * *